US007756122B2

(12) United States Patent
Alexiou et al.

(10) Patent No.: US 7,756,122 B2
(45) Date of Patent: Jul. 13, 2010

(54) METHODS AND DEVICES FOR PROVIDING SEAMLESS GLOBAL ROAMING USING AN ALL-IP NETWORK

(75) Inventors: Triantafyllos Alexiou, Matawan, NJ (US); Parag M. Doshi, Hazlet, NJ (US); Oliver Haase, Fair Haven, NJ (US); Ramana Isukapalli, Edison, NJ (US); Jonathan M. Lennox, Jersey City, NJ (US); Kazutaka Murakami, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2174 days.

(21) Appl. No.: 10/435,016

(22) Filed: May 12, 2003

(65) Prior Publication Data

US 2004/0228324 A1 Nov. 18, 2004

(51) Int. Cl.
*H04L 12/66* (2006.01)
(52) U.S. Cl. ............. 370/353; 455/432.1; 455/432.2; 455/433
(58) Field of Classification Search .......... 370/353; 455/432.2, 432.1, 433
See application file for complete search history.

(56) References Cited

U.S. PATENT DOCUMENTS 5,673,322 A * 9/1997 Pepe et al. ............... 705/52
5,742,668 A * 4/1998 Pepe et al. ............... 455/415
5,742,905 A * 4/1998 Pepe et al. ............... 455/461
5,946,618 A * 8/1999 Agre et al. ............... 455/428
6,741,610 B1 * 5/2004 Volftsun et al. ........... 370/466
6,763,233 B2 * 7/2004 Bharatia .................. 455/433
2004/0176074 A1 * 9/2004 Radpour ................. 455/414.1

FOREIGN PATENT DOCUMENTS

EP 0 583 137 A2 * 2/1994

* cited by examiner

*Primary Examiner*—Quynh H Nguyen
(74) *Attorney, Agent, or Firm*—Capitol Patent & Trademark Law Firm, PLLC

(57) ABSTRACT

A Global Roaming Application Server is adapted to act as an intermediary between all Internet Protocol (IP)-based network(s) and non-IP-based network(s), such as a circuit-switched landline network, an ANSI-41 network, wireless LAN network, a Global System for Mobile Communications network or Universal Mobile Telecommunications System network. In a first or forward direction, the Application Server enables a user in a non-IP network to be located in accordance with user profiles at the request of another user who has chosen to send a message via an all-IP based network. After the user in the non-IP network is so located, the Application Server enables a signaling link to be created between the two users. The Application Server may also be used to enable a signaling link when a message is sent in a second, or reverse direction.

19 Claims, 3 Drawing Sheets

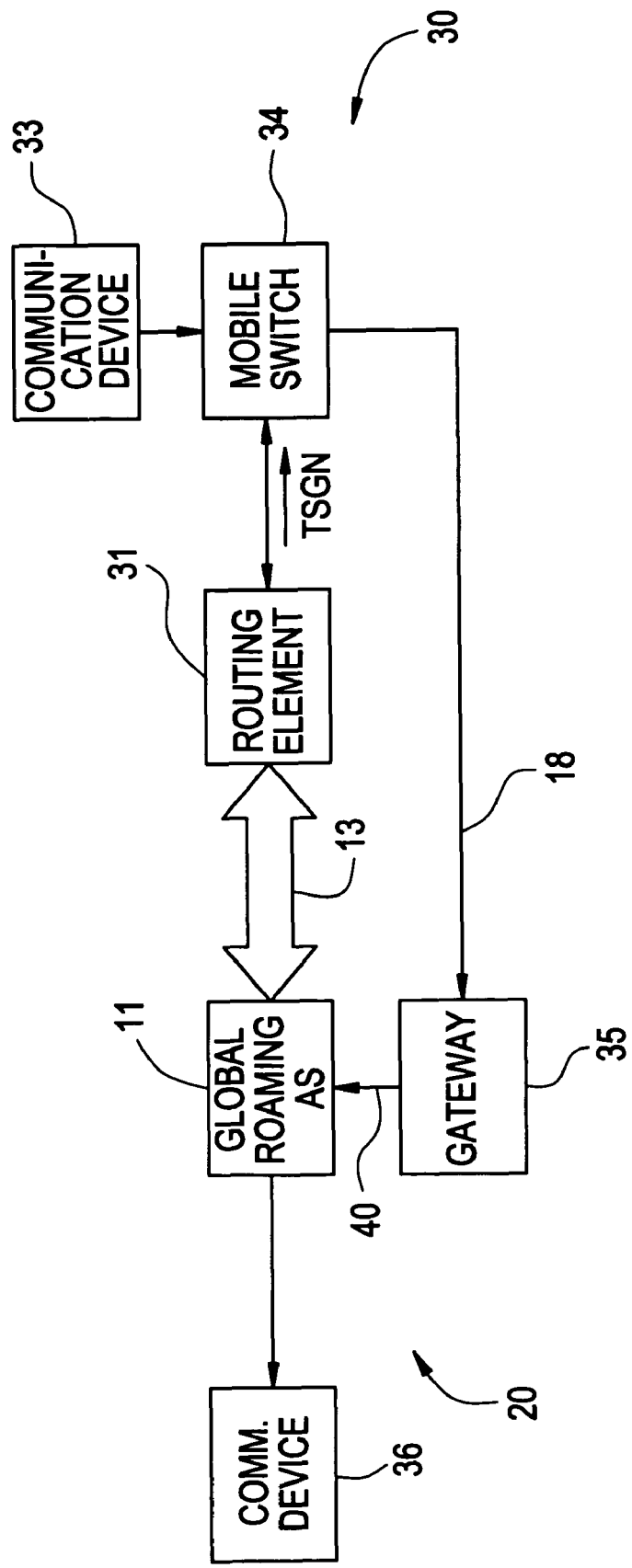

METHODS AND DEVICES FOR PROVIDING SEAMLESS GLOBAL ROAMING USING AN ALL-IP NETWORK

BACKGROUND OF THE INVENTION

The growth of Internet and wireless communications promises to give people the ability to send and receive voice, data and video messages from/to a number of different wired and wireless devices. One of the challenges faced by traditional telephone companies and new entrants in the communications field (collectively referred to herein as "service providers") is how to provide satisfactory service to their customers when such customers travel or "roam" from one kind of network to another. Subscribers would like to be reachable in any network when a caller or so-called "session initiators" attempt to reach them using any one of their "network identities" (e.g., email address, Session Initiation Protocol (SIP)-Uniform Resource Locator (URL), directory number, etc. . . . ) or contact addresses that is not necessarily intrinsic to the network they are presently roaming in. For example, a user is reachable at her cell phone when a caller attempts to initiate a session to the user's IP-based identity or contact address. The ability to offer so-called "seamless, global roaming" is a high priority among national and international service providers.

The ability to provide IP-based voice, video and instant messaging services promises increasing revenues to service providers. Standards for such services have evolved over time. Presently organizations like the $3^{rd}$ Generation Project Partnership (3GPP) and $3^{rd}$ Generation Project Partnership 2 (3GPP2) design such networks based on the popular Internet Engineering Taskforce (IETF) Session Initiation Protocol (SIP). These networks are known by similar terms such as IP Multimedia Core Network (IMCN), IP Multimedia Subsystem (IMS) or all-IP networks. In order to provide seamless global roaming there is a need for techniques that allow for the establishment of a communication session across disparate networks independent of the network to which a user of an originating message belongs to.

Thus, there is a need in the art for techniques that provide seamless global roaming to users who use multiple identities or contact addresses or who operate devices in all-IP networks or in different networks using different protocols.

SUMMARY OF THE INVENTION

In accordance with the present invention there are provided techniques for carrying out seamless, global roaming using an all-IP network (s). One technique provides for an application server (AS) operable to receive a first Internet Protocol (IP)-based message associated with a public identity and user profiles associated with a far-end user, generate a modified, IP protocol-based message based on a first routing value, and send the modified message to an element of an IP network to eventually enable a signaling link to be established between a near-end user and the far-end user. Prior to sending the modified message the AS may first send a location determination message to an element of a non-IP network based on the received IP protocol-based message and profiles, and, in return, receive the first routing value associated with the far-end user. A signaling link can then be said to be established in one direction from the near-end user to the far-end user.

A link may also be established in the opposite or reverse direction. One technique envisioned by the present invention includes receiving a location determination message associated with a directory number from a non-IP network, identifying one or more IP devices associated with the directory number and a plurality of IP contact addresses, sending a second routing value to the non-IP network, receiving a IP-based message comprising an identification value associated with the routing value or an activity identification and then sending a plurality of modified, IP-based messages constructed based on previously stored routing values or activity identifications to an IP network.

Other aspects and features of the present invention will become apparent from the drawings, detailed description of the invention and claims that follow.

BRIEF DESCRIPTION OF THE DRAWINGS

FIG. 3 is a simplified block diagram of a technique which provides seamless global roaming between devices communicating through an all IP-based network to a non-IP network in a second direction or reverse direction.

DETAILED DESCRIPTION OF THE INVENTION

Figure 1:
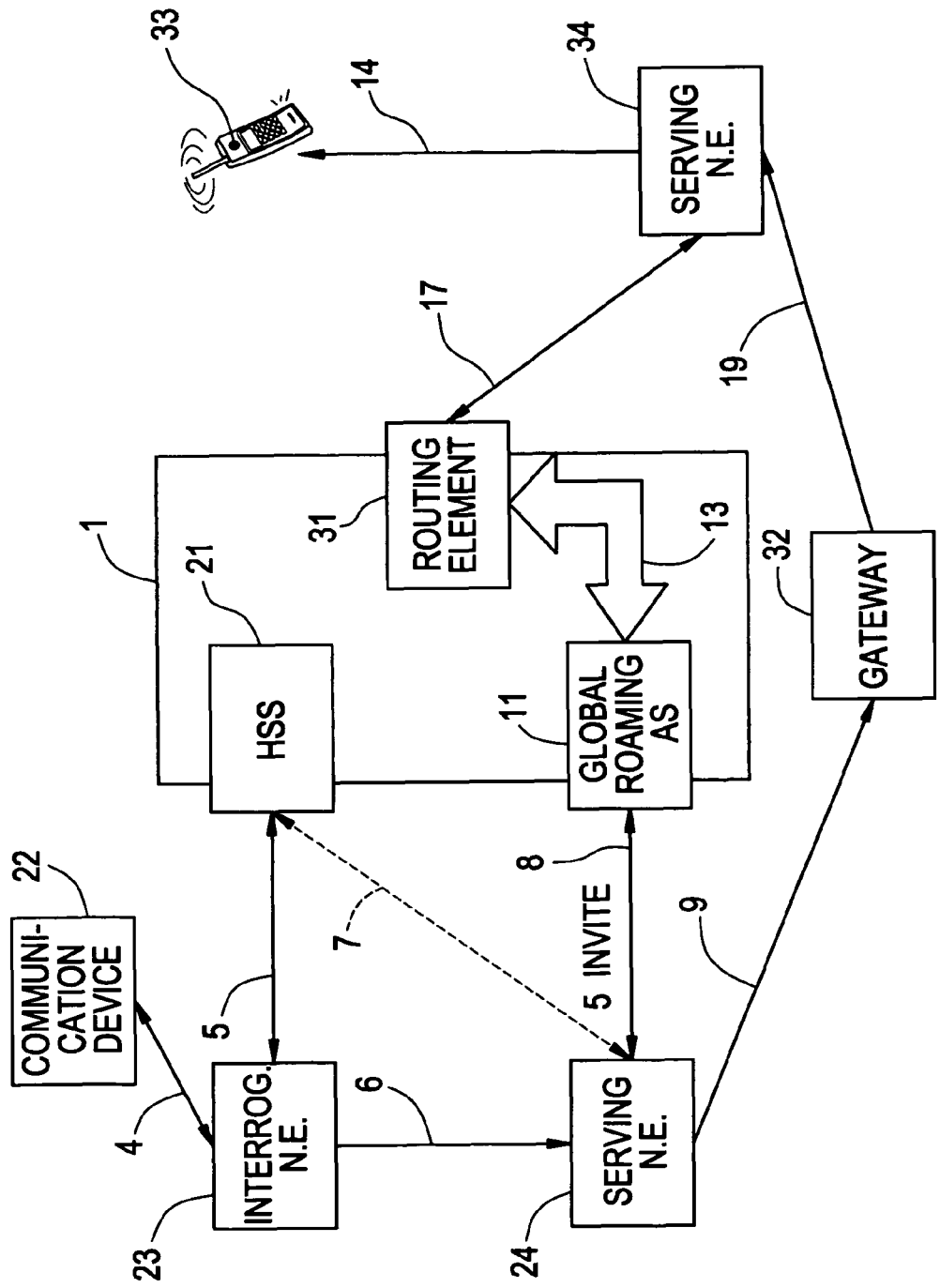
FIG. 1 is a simplified block diagram of a technique which provides seamless global roaming between devices communicating through an all IP-based network to a non-IP network in a first or forward direction making use of a remotely located, applications server (AS) according to one embodiment of the present invention.

FIG. 1 depicts an example of a technique for enabling global roaming through the use of an all-IP network according to one embodiment of the present invention. Acting as an "intermediary" of sorts between an all-IP network 2 and a non-IP network 3 is a "global roaming" AS 11. The AS 11, generally speaking, is operable to receive and send information from both an all-IP network and a non-IP network in order to identify and locate a user of devices 33 (or 22) in accordance with stored, user profiles. In the embodiment shown in FIG. 1, the AS 11 is shown operating between a 3GPP, Session Initiation Protocol (SIP), all-IP network 2 (SIP for short) and a well-known non-IP based network, namely, an ANSI-41 circuit services network 3 (e.g., ANSI-41 for short). It should be understood that any type of network can be substituted for the ANSI-41 network 3 and that an Internet-based IP network, 3GPP2 or any other all-IP network may be substituted for network 2.

Once the appropriate devices 33 are identified and located a link (sometimes referred to as a "signaling path") between the device 33 and device 22 can be established. Without the AS 11, it is practically impossible to form a link between device 22 and 33 based on dynamic criteria such as a user's current location information in the same or different networks, network-link cost, provider policies and user preferences associated with time, location, and the like. The following discussion will help to explain the operation of the AS 11 and other devices shown in FIG. 1 in more detail.

For the discussion which follows, the device 22 may or may not be a part of network 2. That is, device 2 may comprise a device capable of generating SIP protocol messages or messages in another protocol. In the latter case, other network elements (not shown in FIG. 1) operate to convert a non-IP message into and IP or SIP-based message (called an "INVITE"). In either case, eventually an IP or SIP-based INVITE is sent to SIP network 2. In contrast, device 33 is operating using a non-IP, ANSI-41 protocol.

When a near-end user desires to send information (e.g., her voice, email, video, etc. . . . ) using device 22 to device 33, one of the challenges faced by the networks involved is to first identify how a far-end user wishes to be contacted (i.e., it is possible that the user may wish an incoming call be sent to multiple locations) and then locate the far-end user and the appropriate device 33 within an associated network 3. The words "near-end" and "far-end" will be used to distinguish the calling party (user of device 22) from the called party (user of device 33). The device 33 may be stationary or moving, may be "on" or "off" or may be associated with a call forwarding service to name just a few of the possible states of device 33. As envisioned by the present invention, the process of identifying and locating the far-end user and device 33 begins when the near-end user of device 22 inputs a far-end identification value (e.g., telephone number, email address), associated with one of many possible devices 33, into device 22. As will be appreciated by the reader, the descriptions near-end and far-end are relative and can be reversed if and when the flow of information is reversed, e.g., initiated from device 33 and not device 22.

Figure 2:
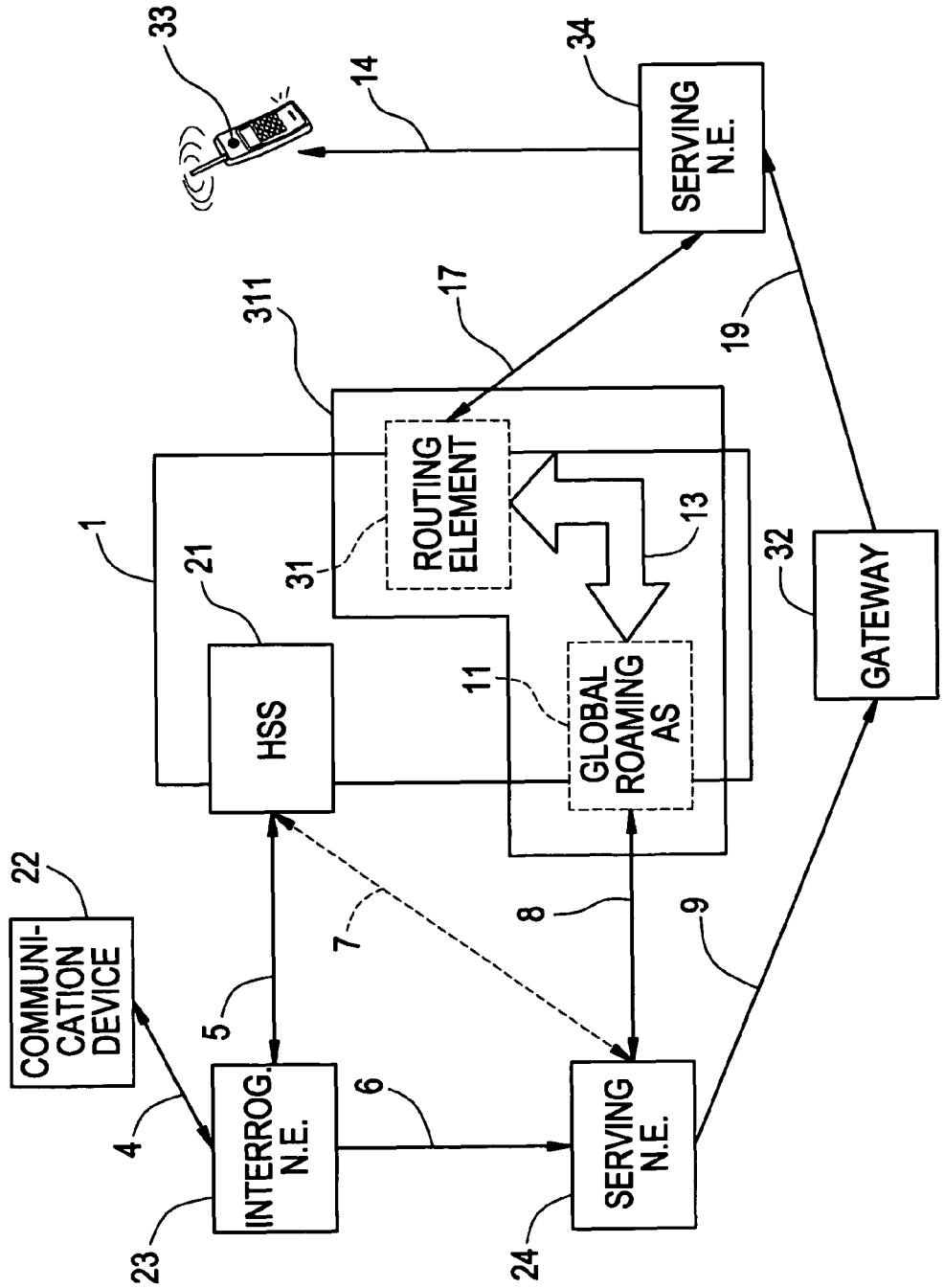
FIG. 2 is a simplified block diagram of a technique which provides seamless global roaming between devices communicating through an all IP-based network to a non-IP network in a first or forward direction making use of a "co-located" AS according to another embodiment of the present invention.

Once the device 22 receives the far-end identification value it is adapted to forward this value to a network element (abbreviated "N.E." in FIGS. 1-3). If the device 2 is operating within the all-IP network 2, the identification value is received by an "interrogating" network element 23. If not, the value is transported over the network which is currently serving device 22 where it must be converted into an IP or SIP protocol-based, INVITE message. A detailed understanding of the contents of the INVITE message is not necessary to understand the present invention. The identification value takes the form of a "request, uniform resource identifier" ("request URI") upon conversion to an SIP-based, INVITE message. Though the request URI is associated with the original identification value, it may not be identical due to changes made to it as it traverses other network elements between device 22 and element 23. For example, if a user of device 22 has a "call forwarding" service this may change the original identification value.

Continuing, in the 3GPP, all-IP network 2, the element 23 is adapted to carry out an Interrogating, Call Session Control Function (I-CSCF). Element 23 will be referred to as an I-CSCF hereafter. This function may be carried out in hardware, software, firmware or a combination of the three. The role of the I-CSCF 23 in the present example is to identify another network element which is capable of relaying the INVITE. This other element is known as a "S-CSCF", short for a Serving, Call Session Control Function element. So it is clear, typically an S-CSCF is not directly associated with a device, such as device 33. Instead, S-CSCFs are configured so that they are capable of carrying out certain services. The I-CSCF 23 identifies the appropriate S-CSCF as follows. Upon receiving the INVITE via pathway 4 from device 22, the I-CSCF 23 is adapted to send a "Location Information Request" (LIR) via pathway 5 to a Home Subscriber Server (HSS) 21. The HSS performs many functions, one of which is to store the profile(s) of each user, including the profile of the user of device 33, within its memory. In actuality, this memory traditionally comprises a database of profiles. These profiles may comprise many different types of information, including public identities associated with each user. Each user can have one or multiple public identities, each served by one S-CSCF at a time. The INVITE message that reaches the I-CSCF 23 targets a public identity. Upon receiving the LIR, the HSS 21 is operable to send information identifying the S-CSCF that serves the public identity. If an S-CSCF has yet to be identified, the HSS 21 sends the I-CSCF 23 information that helps the I-CSCF 23 select an S-CSCF suitable for serving the public identity. The I-CSCF 23 then forwards the INVITE to the appropriate S-CSCF, in this case S-CSCF 24, capable of completing the service and serving the public identity as dictated by the associated profile.

Upon receiving the INVITE from I-CSCF 23, S-CSCF 24 may be adapted to generate and forward a Service Assignment Request (SAR) to HSS 21, when the S-CSCF 24 is not serving that public identity already. The SAR informs the HSS 21 that S-CSCF 24 is the selected network element which has been assigned to carry out the services associated with the user of device 33. At this point, the HSS 21 is operable to respond to the SAR by sending, among other things, "filtering criteria" and user profiles to S-CSCF 24. The S-CSCF 24 is operable to receive the profile information along with filtering criteria. The filtering criteria is used by S-CSCF 24 to identify the correct AS (or sequence of ASs) it needs to communicate with upon receiving the INVITE. The filtering criteria is typically input into the HSS 21 by a service provider when a user of device 33 (or 22 for that matter) subscribes to receive services offered by the provider. A service provider may use a "provisioning system" to input such data/criteria into the HSS 21.

Hereafter, each time the HSS 21 receives the identical LIR from I-CSCF 23 it will know that S-CSCF 24 is the correct S-CSCF. In response to subsequent LIRs the HSS 21 will inform the I-CSCF 23 that S-CSCF 24 is the appropriate S-CSCF, thereby relieving the I-CSCF 23 of the task of having to select an S-CSCF.

At this point the S-CSCF 24 is ready to send the INVITE to an appropriate AS in accordance with the filtering criteria received from the HSS 21. Turning now to some of the operations carried out by AS 11, in one embodiment of the invention, upon receiving an INVITE and profiles (the latter from HSS 21) AS 11 is adapted to carry out techniques designed to execute the services embedded in the INVITE, by, for example, generating a "location determination message" (LDM). This message is generated based on user profiles and is a message which is intended to request a "routing value" associated with the user of device 33 or to initiate the discovery of the location of the user of device 33 or other devices associated with the same user. The AS 11 is operable to send an LDM on to a routing network element 31 (e.g., a Home Location Register (HLR)). In this example of the invention, the AS 11 and element 31 are not co-located, that is, they are not located in substantially the same place.

The example shown in FIG. 1 depicts a communication pathway 13 between AS 11 and element 31. In one embodiment of the invention, the pathway 13 and element 31 may comprise a common operations (COPS) interface, such as is disclosed in co-pending U.S. patent application Ser. No. 10/435,015, filed concurrently with the present application, the disclosure of which is incorporated herein by reference. The COPS interface is operable to allow messages to be exchanged between elements of networks operating using different protocols. It should be understood the pathway 13 may not be a direct connection between AS 11 and element 31. That is to say, other network elements (not shown) may, in actuality, be used between AS 11 and element 31. In yet other embodiments of the invention, the pathway 13 may comprise a protocol specific interface. In general, all of the pathways shown in FIGS. 1-3 (e.g., 4, 6, 9, 13, 14, 17, 19, etc. . . . ) may, in actuality, contain other network elements which are not shown to simplify the present discussion and which are not necessary for an understanding of the present invention.

Alternatively, the AS 11 and element 31 may be co-located as indicated by element 311 in FIG. 2. When co-located, the interface 13 and element 31 may or may not comprise a COPS interface.

Routing network element 31 forwards the LDM on to an appropriate serving network element 34 within network 3. In one embodiment of the invention, element 34 may comprise a Serving Mobile Switching Center (S-MSC). Upon receiving an appropriate message from element 31, S-MSC 34 is adapted to select a "temporary location directory number" (tldn). This number represents the above-mentioned routing value which is temporarily assigned to the incoming message from element 31. S-MSC 34 is operable to store a number of temporary tldns which it assigns to incoming messages. A tldn (or other routing value) is analogous to a telephone number. However, it is not the number which would be called by a user of device 22 if she desired to speak to the user of device 33. Rather, a tldn is a value known mostly (and sometimes only) by a service provider which is used internally by the service provider's network elements to route messages.

To be clear, if network 3 is not an ANSI-41 network, then the element 34 may comprise a different type of network element than an S-MSC which generates a routing value which is somewhat different than a tldn. In general, element 34 is operable to generate a routing value and associate that value with the message originating from element 31. Once the S-MSC 34 generates a tldn routing value, it is operable to send this tldn to element 31, which in turn sends it to AS 11.

The AS 11 is then operable to receive the tldn and to generate one or more "rewritten" or modified INVITEs, comprising the tldn or routing value assigned by element 34. Though a single modified INVITE is usually associated with a different device, it should be understood that two or more INVITES may be associated with the same device. This enables the AS 11 to potentially contact a number of devices associated with the same public identity, or a user who is using a number of different public identities (e.g., email addresses). The hope is that, by contacting all of the user's devices, etc. . . . the user can be reached on one of them. To distinguish this modified INVITE from the original INVITE, it will be referred to as a "modified INVITE" or m-INVITE for short. After generating the m-INVITEs, the AS 11 is further adapted to forward the one or more m-INVITEs to S-CSCF 24. It can be said at this point that device 33 has been located and identified. The next step is to establish a signaling connection between devices 22 and 33 (between a near-end user and far-end user). Before moving on to a discussion of how the signaling link between devices 22 and 33 is finally established, one further note about AS 11 is in order. In some instances, AS 11 can be operable to return a "re-directed" message upon receiving an INVITE from element 24. Such a message may, among other things, re-direct the INVITE to another network element.

Establishing the signaling connection between device 22 and 33 is left up to Gateway 32. In one embodiment of the invention, Gateway 32 comprises a Media Gateway Control Function (MGCF) gateway. MGCF 32 is adapted to convert the m-INVITE it receives from S-CSCF 24, which comprises the tldn, from an SIP protocol-based message to an ANSI-41 protocol-based message. Generally speaking, element 32 is operable to convert a message in one protocol into a message in another protocol in order to establish a signaling path. In the examples shown in FIGS. 1 and 2, the MGCF 32 is operable to send a so-converted message on to S-MSC 34 via pathway 19. Thereafter, S-MSC 34 is operable to initiate "link establishment procedures" designed ultimately to form a signaling link between devices 22 and 33. As mentioned above, pathway 19 may contain other network elements, including other S-MSCs. In an alternative embodiment of the invention, MGCF 32 may send the converted message to an intervening S-MSC. Eventually, however, the converted message arrives at element 34 to establish the link.

AS 11 is operable to receive profiles from the HSS 21. These profiles provide instructions to the AS 11, instructions that govern the proper execution of INVITEs received by AS 11. For example, the AS 11 is operable to determine whether the user of device 33 wishes to be contacted through device 33 or another device. In yet another embodiment of the invention, the user profile information may be sent to the AS 11 from a user profile database which is not, strictly speaking, a part of the HSS 21.

Alternative techniques my also be employed to forward the routing value back to the AS 11. Instead of transporting the routing value from element 31 through pathway 13 back to AS 11, routing values may be transported from element 31 to the HSS 21 and then to AS 11. This may occur where the element 31 comprises a generalized HLR instead of a Protocol Dependent Logic Server (PDLS). Regardless of how the routing value is transported, once received by the AS 11, the AS 11 is operable to generate an appropriate, modified INVITE.

Yet other techniques may be used that involve specific routing values (e.g., the actual telephone number, facsimile number, etc. . . . of device 33). In this example of the invention, such specific numbers are returned by element 34 to HSS 21, on to AS 11 and finally on to S-CSCF 24. This removes the need to use pathway 13.

In the discussion above, user contact addresses were downloaded to the AS 11. It should be understood that this may not always be the case. Alternatively, the addresses may be "built" or otherwise constructed by the AS 11 from information contained within received routing values or, further still, may reside originally within the AS 11. These contact addresses may be a user's public identities in multiple SIP domains or those registered by a user via SIP REGISTER messages. Alternatively, these addresses may be downloaded from some other database which may be part of AS 11.

Additionally, the AS 11 is operable to collect registration contact addresses for storage in some internal database for forwarding to some external system. For example, if the AS 11 also comprises an SIP registrar, then collection of such contact addresses and the registration status of a user becomes straight forward.

If the AS 11 does not comprise an SIP registrar, (i.e., the SIP registrar is some other SIP server), there are alternative solutions. In a 3GPP/3GPP2 domain the AS 11 is operable to at least:

Subscribe to a registration event package at an S-CSCF; and

Receive REGISTER SIP messages from an S-CSCF with the required filtering criteria set in the user's profile. In this case, AS 11 is operable to discover implicitly registered public identities upon processing of user profiles.

In a non-3GPP/3GPP2 domain, a "registration event package" technique can still be used, provided that there is a server in the domain that provides registration events for applicable users.

In any other SIP domain, a technique where all SIP REGISTER messages and responses pass through AS 11 is easily implemented. In other words, AS 11 is operable to remain in the signaling path between a SIP User Agent Client (UAC) and a SIP REGISTRAR. If the SIP UAC is notified of implicitly registered identities via SUBSCRIBE/NOTIFY messages, then the technique must be altered such that these messages and associated SIP response messages pass through the AS 11. In this manner, because the AS 11 sees all of these messages, it can examine them and determine the exact registration status of any particular user.

The above discussion also focused on a call, etc., originating from device 22 intended for device 33. Of course, calls may also be initiated by device 33 to 22. In such a case, the inventors envision global roaming can be achieved by the concepts introduced above, and below as follows. Referring now to FIG. 3, in order to route a call from a non-IP mobile network 30 (e.g., a second generation wireless core network) to a network 20, the following call flow may be used. A communication device 33 (e.g., telephone, personal digital assistant, computer) sends a call set-up request to network 30. A Home or Gateway MSC 34 eventually receives the request and, thereafter, is operable to send a request to HLR 31 in order to obtain a routing value (e.g., routing number). The HLR 31 in turn forwards a "second" LDM (referred to as second to distinguish it from the earlier described LDM) on to AS 11. In one embodiment of the invention, the LDM is associated with a directory number. Upon receiving the LDM, the AS 11 is operable to identify one or more IP devices associated with the directory number, and to further identify a plurality of IP contact addresses which may be associated with each IP device. Once the contact addresses have been identified, the AS 11 is further operable to select an appropriate Gateway.

AS 11 then returns a "second" routing value (referred to as such to distinguish it from the routing value described previously above) to the non-IP network 30 (e.g., to HLR 31) which originated the LDM. HLR 31 in turn forwards the routing value to element 34, which then uses it to forward the call request to PSTN/SIP gateway 35. Gateway 35 converts the circuit-switched call request to an IP call request (hereafter referred to as a "second IP-based message") and forwards it on to AS 11 via pathway 40. This second IP-based message comprises an identification value that refers to the second routing value or to an activity identification. Upon receiving this second IP-based message the AS 11 is operable to construct a plurality of second, modified IP-based messages based on previously stored routing values or activity identifications, and forward one or more of them on to one or more IP far-end devices 36 in IP network 20.

The intent of the simplified block diagram in FIG. 3 is to convey the fact that Gateway 35 (e.g., a SIP/PSTN) is operable to act as a signaling bridge between diverse networks 20 and 30, while AS 11 is operable to assist in routing calls to network 20 and to take control of call sessions in the IP domain so that a call's progress can be monitored and features can be executed, e.g. late call-forwarding.

Continuing with a more detailed description of the operation of the network elements shown in FIG. 3, H-MSC or G-MSC 34 is operable to receive a Temporary SIP Gateway Number (tsgn) that directs signaling messages to SIP/PSTN gateway 35. In essence, a tsgn is the same as a tldn; it is a routing value. The difference being that, the tldn routes signals through a S-MSC, while the tsgn routes signals through a SIP/PSTN Gateway, for example.

In the remainder of the discussion below, it is assumed device 33 is operating in an ANSI-41 network, making element 34 an H-MSC. The H-MSC 34 obtains a routing value from AS 11, e.g., a tsgn, and sends it to element 31 (e.g., an HLR) when it receives a request to establish a call via element 31. In response, the H-MSC 34 sends the tsgn to element 31. For the sake of this discussion, it is assumed that element 31 comprises an enhanced HLR system that is operable to communicate with AS 11 directly or other logical entities that, in turn, communicate with AS 11.

Once it is determined that a far-end user is able to receive calls via network 2 and her contact addresses are determined, AS 11 is operable to deliver this call to the user. It should be understood that contact addresses could point to PSTN destinations as well. Again, pathway 13 need not be a direct connection. Instead, pathway 13 represents all possible logical and physical pathways, connections and systems (not shown) between elements 31 and 11 (including software interfaces).

Upon sending a routing value to device 31, AS 11 is operable to establish an association between the tsgn and the user's contact addresses.

A signaling link between devices 33 and 22 can be further established as follows. AS 11 has knowledge of tsgn numbers that "point" to one or more SIP/PSTN gateways (represented by the element 35 in FIG. 3). AS 11 is operable to execute a tsgn selection program which takes into account the location of the H-MSC 34, the location of many SIP/PSTN Gateways 35, and the locations the user's contact addresses point to. When a SIP/PSTN Gateway 35 receives messages via pathway 18, it may be pre-configured to send an INVITE to AS 11 in the form "INVITE sip: TSGN@GRASTransportLayerAddress". If not pre-configured, the SIP/PSTN 35 normally performs a Domain Name System, E164 Number Mapping (DNS ENUM) resolution of the tsgn. The DNS system could be configured to map the tsgn to the SIP URI "sip: TSGN@GRASTransportLayerAddress". The designation "GRASTransportLayerAddress" is some transport layer address that refers to AS 11. As a result the SIP/PSTN Gateway 35 would send the INVITE to the AS 11. "Binding" (i.e., close association of) of tsgns to contact addresses and any other activity within AS 11 is released upon the arrival of a message from element 35, or upon the expiration of some time interval to account for the case when element 11 never receives a message from element 35.

In yet another embodiment of the invention, the AS 11 is operable to select a gateway 35 and request the gateway establish a binding relationship between a Gateway generated tsgn and some contact addresses. In this case, the AS 11 is operable to request that the generated tsgn be associated with a SIP URI in the form sip: ACTID@GRASTransportLayerAddress. "ACTID" is an abbreviation for "activity identity", specifically, one that allows the AS 11 to look up some previously saved call state. Thereafter, the SIP/PSTN Gateway 35 will generate an "INVITE<sip:ACTID@GRASTrasnsportLayerAddress>" which is sent to AS 11, when it receives messages via pathway 18 from the H-MSC 34. The binding relationship between a tsgn-SIP URI is released upon the arrival of a message via pathway 18 or upon the expiration of some time interval negotiated between the SIP/PSTN 35 and AS 11 to account for a case when a message is not received via pathway 18.

In both embodiments just discussed above, the AS 11 is operable to associate messages received from element 35 via pathway 20 with contact addresses, etc., of a subscriber. Therefore, AS 11 is operable to generate one or more INVITEs as needed (i.e., as designated by the contact addresses). The AS 11 is also operable to remain "on" the signaling path from the SIP/PSTN Gateway 35 to SIP endpoints (e.g., an SIP-User Agent Server (UAS)) designated by the contact addresses, etc., in order to monitor call progress.

The AS 11 may generate one or more INVITEs with or without knowledge of a user's contact addresses. For example, when the AS 11 has knowledge of a user's contact addresses, it is operable to generate INVITE messages which are targeted at those contact addresses.

On the other hand, if the AS 11 does not have knowledge of a user's contact addresses, but does have knowledge of its public identity, the AS 11 is operable to forward a particular INVITE towards an appropriate I-CSCF; and/or access the HSS 21 to discover the address of the appropriate S-CSCF and then forward the INVITE to the appropriate S-CSCF, or if there is no S-CSCF identified, forward the INVITE to an appropriate I-CSCF, provided the AS 11 is operating in a 3GPP/3GPP2 network.

If the AS 11 is operating in a non-3 GPP/3GPP2 network, and the AS 11 does not have knowledge of a user's contact addresses, but does have knowledge of its public identities, then the AS 11 may be operable to forward an INVITE to a SIP server previously determined via SIP procedures.

If an AS 11 is operating in a non-3 GPP/3GPP2 network, it is envisioned that all INVITEs and other associated SIP responses and requests would pass through AS 11. This would enable the AS 11 to see and examine all SIP-related, server traffic. One potential hurdle to such a technique is that a SIP domain server would be unaware of the existence of AS 11. Alternatively, the SIP server may be operable to carry out the functions of AS 11, i.e., carry out the features related to global roaming, discussed above.

The discussion above has used the term SIP messages, responses, etc. Without attempting to give the exact makeup of such a message, as will be recognized by those skilled in the art, there are many variations of SIP messages which may be used to implement the ideas discussed above.

The discussion above illustrates one or more techniques for providing seamless global roaming. Variations on the above techniques may be envisioned by those skilled in the art without departing from the spirit or scope of the present invention. For example, instead of an ANSI-41 network, network 3 may comprise a wireless LAN network, Global System for Mobile Communications (GSM)-based network or a Universal Mobile Telecommunications System (UMTS)-based network. In addition, though the elements shown in FIGS. 1-3 (e.g., AS 11) are shown as single units, they may comprise one or more units.

Though the discussion above sets forth some examples of the present invention, in no way can these examples foresee all of the possible techniques which may be used to implement the ideas envisioned by the present invention. Instead, the scope of the ideas envisioned by the present invention is defined by the claims which follow.

We claim:

1. An application server (AS) operable to:
receive a first Internet Protocol (IP)-based message, initiated by a near-end user, where the message is associated with a public identity and user profiles of a far-end user;
send a location determination message to an element of a non-IP network based on the received IP protocol-based message and profiles;
receive a first routing value associated with the far-end user;
generate a modified, IP protocol-based message based on the first routing value; and
send the modified message to an element of an IP network to eventually enable a signaling link to be established between the near-end user and the far-end user,
wherein the IP network is selected from at least the group consisting of an Internet-based network, a 3GPP, all-IP network and a 3GPP2, all-IP network, and the non-IP network is selected from at least the group consisting of circuit-switched, landline network, an ANSI-41 network, a wireless LAN network, a Global System for Mobile Communications network and a Universal Mobile Telecommunications System network.

2. The application server as in claim 1 further operable to select a non-IP device associated with the public identity to establish the link.

3. The application server as in claim 1 further operable to select a non-IP device which is not associated with the public identity to establish the link.

4. The application server as in claim 1 wherein the AS comprises a co-located element of the non-IP network.

5. The application server as in claim 1 further comprising a common operations interface operable to allow the sending of the location determination message to the element of the non-IP network.

6. The application server as in claim 1 further operable to execute the first IP-protocol-based message in accordance with the profiles.

7. The application server in claim 1 further operable to generate a plurality of modified, IP-based protocol messages.

8. The application server as in claim 1 wherein the modified message comprises a re-directed message.

9. The application server as in claim 1 further operable to:
receive a location determination message associated with a directory number from a non-IP network;
identify one or more IP devices associated with the directory number;
identify a plurality of IP contact addresses;
send a second routing value to the non-IP network;
receive a IP-based message comprising an identification value associated with the routing value or an activity identification; and
send a plurality of modified, IP-based messages constructed based on previously stored routing values or activity identifications to an IP network.

10. An application server operable to:
receive a location determination message associated with a directory number from a non-IP network;
identify one or more far-end IP devices associated with the directory number;
identify a plurality of IP contact addresses;
send a routing value to the non-IP network;
receive an IP-based message comprising an identification value associated with the routing value or an activity identification; and
send a plurality of modified IP-based messages constructed based on previously stored routing values or activity identifications to an IP network,
wherein the IP network is selected from at least the group consisting of an Internet-based network, a 3GPP, all-IP network and a 3GPP2, all-IP network, and the non-IP network is selected from at least the group consisting of circuit-switched, landline network, an ANSI-41 network, a wireless LAN network, a Global System for Mobile Communications network and a Universal Mobile Telecommunications System network.

11. A method for providing seamless global roaming using an all-IP network comprising:
receiving a first Internet Protocol (IP)-based message, initiated by a near-end user, where the message is associated with a public identity and user profiles of a far-end user;
sending a location determination message to an element of a non-IP network based on the received IP protocol-based message and profiles;
receiving a first routing value associated with the far-end user;

generating a modified, IP protocol-based message based on the first routing value; and sending the modified message to an element of an IP network to eventually enable a signaling link to be established between the near-end user and the far-end user, wherein the IP network is selected from at least the group consisting of an Internet-based network, a 3GPP, all-IP network and a 3GPP2, all-IP network, and the non-IP network is selected from at least the group consisting of circuit-switched, landline network, an ANSI-41 network, a wireless LAN network, a Global System for Mobile Communications network and a Universal Mobile Telecommunications System network.

12. The method as in claim 11 further comprising selecting a non-IP device associated with the public identity to establish the link.

13. The method as in claim 11 further comprising selecting a non-IP device which is not associated with the public identity to establish the link.

14. The method as in claim 11 further comprising using a common operations interface to allow the sending of the location determination message to the element of the non-IP network.

15. The method as in claim 11 further comprising executing the first IP-protocol-based message in accordance with the profiles.

16. The method as in claim 11 further comprising generating a plurality of modified, IP-based protocol messages.

17. The method as in claim 11 wherein the modified message comprises a redirected message.

18. The method as in claim 11 further comprising:
receiving a location determination message associated with a directory number from a non-IP network;
identifying one or more IP devices associated with the directory number;
identifying a plurality of IP contact addresses;
sending a second routing value to the non-IP network;
receiving a IP-based message comprising an identification value associated with the routing value or an activity identification; and
sending a plurality of modified, IP-based messages constructed based on previously stored routing values or activity identifications to an IP network.

19. A method for providing seamless global roaming using an all-IP network comprising:
receiving a location determination message associated with a directory number from a non-IP network;
identifying one or more far-end IP devices associated with the directory number;
identifying a plurality of IP contact addresses;
sending a routing value to the non-IP network;
receiving an IP-based message comprising an identification value associated with a plurality of, modified IP-based messages constructed based on previously stored routing values or activity identifications to an IP network,
wherein the IP network is selected from at least the group consisting of an Internet-based network, a 3GPP, all-IP network and a 3GPP2, all-IP network, and the non-IP network is selected from at least the group consisting of circuit-switched, landline network, an ANSI-41 network, a wireless LAN network, a Global System for Mobile Communications network and a Universal Mobile Telecommunications System network.

* * * * *